US011387442B2

United States Patent
Kawasaki et al.

(10) Patent No.: US 11,387,442 B2
(45) Date of Patent: Jul. 12, 2022

(54) NEGATIVE ELECTRODE FOR LITHIUM ION SECONDARY BATTERY AND LITHIUM ION SECONDARY BATTERY COMPRISING THE SAME

(71) Applicant: NEC CORPORATION, Tokyo (JP)

(72) Inventors: Daisuke Kawasaki, Tokyo (JP); Takuya Hasegawa, Tokyo (JP); Takashi Ohtsuka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 129 days.

(21) Appl. No.: 16/638,824

(22) PCT Filed: Aug. 17, 2018

(86) PCT No.: PCT/JP2018/030511
§ 371 (c)(1),
(2) Date: Feb. 13, 2020

(87) PCT Pub. No.: WO2019/039399
PCT Pub. Date: Feb. 28, 2019

(65) Prior Publication Data
US 2020/0194776 A1 Jun. 18, 2020

(30) Foreign Application Priority Data
Aug. 24, 2017 (JP) .............................. JP2017-161133

(51) Int. Cl.
*H01M 4/134* (2010.01)
*H01M 4/38* (2006.01)
(Continued)

(52) U.S. Cl.
CPC .......... *H01M 4/134* (2013.01); *H01M 4/386* (2013.01); *H01M 4/622* (2013.01); *H01M 4/661* (2013.01);
(Continued)

(58) Field of Classification Search
CPC ......... H01M 10/0525; H01M 10/0567; H01M 2004/021; H01M 2004/027;
(Continued)

(56) References Cited

U.S. PATENT DOCUMENTS

2009/0111031 A1   4/2009   Hirose et al.
2011/0183207 A1   7/2011   Hirose et al.
(Continued)

FOREIGN PATENT DOCUMENTS

JP   2007-095670 A   4/2007
JP   2007-165078 A   6/2007
(Continued)

OTHER PUBLICATIONS

C. C. Nguyen, B. L. Lucht. Comparative Study of Fluoroethylene Carbonate and Vinylene Carbonate for Silicon Anodes in Lithium Ion Batteries, Journal of the Electrochemical Society, 161 (12) A1933-A1938 (2014).*
(Continued)

*Primary Examiner* — Carlos Barcena
(74) *Attorney, Agent, or Firm* — Sughrue Mion, PLLC

(57) ABSTRACT

Provided is a lithium ion secondary battery having high energy density and excellent cycle characteristics. The present invention relates to a negative electrode for a lithium ion secondary battery comprising: (i) a negative electrode mixture layer comprising a negative electrode active material and a negative electrode binder and (ii) a negative electrode current collector, wherein the negative electrode active material comprises an alloy comprising silicon (Si alloy), the Si alloy is crystalline and has a median diameter (D50 particle size) of 1.2 μm or less, and an amount of the negative electrode binder based on the weight of the negative electrode mixture layer is 12% by weight or more and 50% by weight or less.

7 Claims, 3 Drawing Sheets

(51) Int. Cl.
  *H01M 4/62* (2006.01)
  *H01M 4/66* (2006.01)
  *H01M 10/0525* (2010.01)
  *H01M 10/0567* (2010.01)
  *H01M 4/02* (2006.01)

(52) U.S. Cl.
  CPC ............... *H01M 10/0525* (2013.01); *H01M 10/0567* (2013.01); *H01M 2004/027* (2013.01); *H01M 2300/0025* (2013.01)

(58) Field of Classification Search
  CPC ..... H01M 2220/20; H01M 2300/0025; H01M 4/134; H01M 4/386; H01M 4/622; H01M 4/661
  See application file for complete search history.

(56) References Cited

U.S. PATENT DOCUMENTS

| | | | | |
|---|---|---|---|---|
| 2013/0266865 | A1* | 10/2013 | Kwon | H01M 4/624 429/220 |
| 2014/0106219 | A1* | 4/2014 | Wang | H01M 4/386 429/218.1 |
| 2017/0005331 | A1 | 1/2017 | Kurihara | |
| 2019/0051928 | A1 | 2/2019 | Kawasaki et al. | |
| 2019/0123337 | A1 | 4/2019 | Hasegawa | |

FOREIGN PATENT DOCUMENTS

| | | |
|---|---|---|
| JP | 2009-110846 A | 5/2009 |
| JP | 2009-252348 A | 10/2009 |
| JP | 2010-092830 A | 4/2010 |
| JP | 2011-154901 A | 8/2011 |
| JP | 2016-115635 A | 6/2016 |
| WO | 2015/141231 A1 | 9/2015 |
| WO | 2017/094712 A1 | 6/2017 |
| WO | 2017/150311 A1 | 9/2017 |
| WO | 2017/179429 A1 | 10/2017 |
| WO | 2017/204213 A1 | 11/2017 |

OTHER PUBLICATIONS

International Search Report for PCT/JP2018/030511 dated Nov. 20, 2018 (PCT/ISA/210).
Japanese Office Action for JP Application No. 2019-537601 dated Sep. 7, 2021 with English Translation.

* cited by examiner

NEGATIVE ELECTRODE FOR LITHIUM ION SECONDARY BATTERY AND LITHIUM ION SECONDARY BATTERY COMPRISING THE SAME

CROSS REFERENCE TO RELATED APPLICATIONS

This application is a National Stage of International Application No. PCT/JP2018/030511 filed Aug. 17, 2018, claiming priority based on Japanese Patent Application No. 2017-161133, filed Aug. 24, 2017.

TECHNICAL FIELD

The present invention relates to a negative electrode for a lithium ion secondary battery, a lithium ion secondary battery comprising the same, and the like.

BACKGROUND ART

Lithium ion secondary batteries have advantages such as high energy density, low self-discharge, excellent long-term reliability and the like, and therefore they have been put into practical use in notebook-type personal computers, mobile phones and the like. Furthermore, in recent years, in addition to high functionality of electronic devices, by expansion of the market for motor-driven vehicles such as electric vehicles and hybrid vehicles, and acceleration of development of home and industrial power storage systems, development of a high performance lithium ion secondary battery which is excellent in battery characteristics such as cycle characteristics and storage characteristics and further improved in capacity and energy density has been demanded.

As a negative electrode active material for providing a high-capacity lithium ion secondary battery, metal-based active materials such as silicon, tin, and alloys and metal oxides containing them have attracted attention. However, while these metal-based negative electrode active materials provide high capacity, the expansion and contraction of the active materials during absorbing and desorbing lithium ions is large. Due to the volume change of expansion and contraction, the negative electrode active material particles collapse during repeated charge and discharge, resulting in that the new active surface is exposed. This active surface has had a problem of decomposing the solvent of the electrolyte solution and deteriorating the cycle characteristics of the battery. Various studies have been made to improve battery characteristics of lithium ion secondary batteries. For example, Patent Document 1 describes an electrode comprising a negative electrode active material comprising silicon oxide and a binder including alginate.

CITATION LIST

Patent Document

Patent Document 1: WO2015/141231

SUMMARY OF INVENTION

Technical Problem

A lithium ion secondary battery having an electrode with an energy density higher than that of the electrode described in Patent Document 1 has been required. However, since silicon has a large volume change due to absorbing and desorbing lithium, there has still remained a problem that if the content of silicon in the negative electrode is large, the cycle characteristics during charge and discharge are deteriorated. Thus, further improvement has been required.

Solution to Problem

One aspect of the present example embodiment relates to the following matter.

A negative electrode for a lithium ion secondary battery comprising:

(i) a negative electrode mixture layer comprising a negative electrode active material and a negative electrode binder and (ii) a negative electrode current collector, wherein the negative electrode active material comprises an alloy comprising silicon (Si alloy), the Si alloy is crystalline and has a median diameter (D50 particle size) of 1.2 μm or less, and an amount of the negative electrode binder based on the weight of the negative electrode mixture layer is 12% by weight or more and 50% by weight or less.

Advantageous Effect of Invention

According to the present example embodiment, a lithium ion secondary battery having a high energy density and excellent cycle characteristics can be provided.

DESCRIPTION OF EXAMPLE EMBODIMENTS

Figure 1:
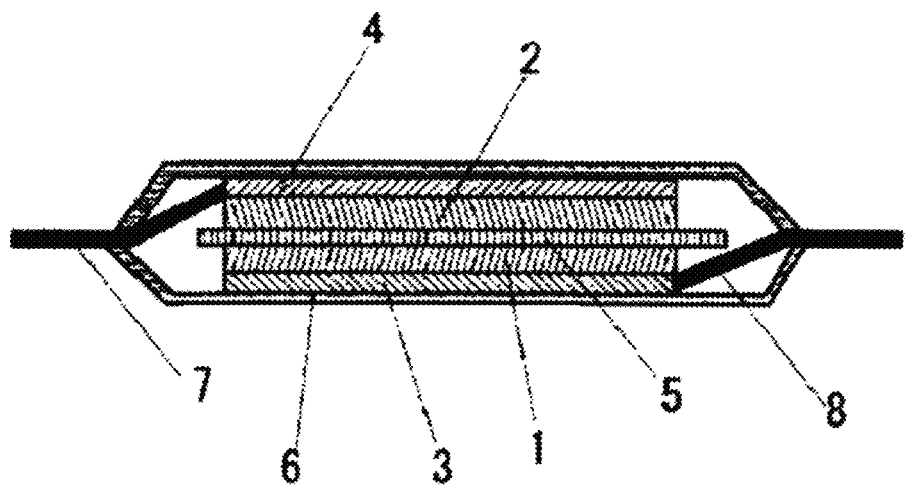
FIG. 1 is a sectional view of a secondary battery according to one example embodiment of the present invention.

The negative electrode and a lithium ion secondary battery comprising the same (also simply referred to as "secondary battery") according to the present example embodiment will be described in detail for each constituting member. In this specification, "cycle characteristics" means characteristics such as a capacity retention ratio after repeating the charge and discharge.

<Negative Electrode>

The negative electrode may have a structure in which a negative electrode mixture layer comprising a negative electrode active material is formed on a current collector. A negative electrode of the present example embodiment comprises, for example, a negative electrode current collector formed of a metal foil and a negative electrode mixture layer formed on one surface or both surfaces of the negative electrode current collector. The negative electrode mixture layer is formed so as to cover the negative electrode current collector with a negative electrode binder. The negative electrode current collector is arranged to have an extended portion connected to a negative electrode terminal, and the negative electrode mixture layer is not formed on the extended portion. Here, in the present specification, the "negative electrode mixture layer" refers to a portion other than the negative electrode current collector among the constituent elements of the negative electrode, and comprises a negative electrode active material and a negative electrode binder, and may comprise, as necessary, an additive such as an electrically conductive assistant agent. The negative electrode active material is a material capable of absorbing and desorbing lithium. In the present specification, a substance that does not absorb and desorb lithium, such as a binder, is not included in the negative electrode active material.

The negative electrode for a lithium ion secondary battery of one embodiment of the present example embodiment comprises:

(i) a negative electrode mixture layer comprising a negative electrode active material and a negative electrode binder and (ii) a negative electrode current collector, wherein
the negative electrode active material comprises a Si alloy,
the Si alloy is crystalline and has a median diameter (D50 particle size) of 1.2 µm or less, and
an amount of the negative electrode binder based on the total weight of the negative electrode mixture layer is 12% by weight or more and 50% by weight or less.

(Negative Electrode Active Material)

In the present example embodiment, the negative electrode active material comprises an alloy comprising silicon (also referred to as "Si alloy" or "silicon alloy"). The alloy comprising silicon may be an alloy of silicon and a metal other than silicon (non-silicon metal), and for example, an alloy of silicon and at least one selected from the group consisting of Li, B, Al, Ti, Fe, Pb, Sn, In, Bi, Ag, Ba, Ca, Hg, Pd, Pt, Te, Zn, La, Ni and P is preferable, and an alloy of silicon and at least one selected from the group consisting of Li, B, Ti, Fe, Ni, Al, and P is more preferable. The content of non-silicon metal in the alloy of silicon and a non-silicon metal is not particularly limited, but for example, it is preferably 0.1 to 5 mass %. Examples of the method for producing the alloy of silicon and a non-silicon metal include a method of mixing and melting elemental silicon and a non-silicon metal, and a method of coating the surface of elemental silicon with a non-silicon metal by vapor deposition or the like.

The Si alloy is preferably crystalline. When the Si alloy is crystalline, the discharge capacity can be increased. The fact that silicon is crystalline may be confirmed by powder XRD analysis. Even when silicon particles are present in the electrode, not in a powder state, crystallinity can be confirmed by electron beam diffraction analysis by irradiating an electron beam.

When the crystallinity of the silicon alloy particle is high, the active material capacity and charge and discharge efficiency tend to be increased. On the other hand, if the crystallinity thereof is low, the cycle characteristics of the lithium ion secondary battery may be improved in some cases. However, the amorphous state may generate a plurality of crystal phases of the negative electrode in the charged state in some cases, and thus deviations in the negative electrode potential become large. Crystallinity may be evaluated from calculation by Scherrer equation using FWHM (Full Width Half Maximum). The approximate crystallite size which results in being crystalline is, but not limited to, preferably 50 nm or more and 500 nm or less, more preferably 70 nm or more and 200 nm or less.

The median diameter (D50 particle size) of the Si alloy is preferably 1.2 µm or less, more preferably 1 µm or less, further preferably 0.7 µm or less, still further preferably 0.6 µm or less, and still more further preferably 0.5 µm or less. The lower limit of the median diameter of the Si alloy is not particularly limited, but it is preferably 0.05 µm or more, more preferably 0.1 µm or more. When the median diameter of the crystalline silicon is 1.2 µm or less, volume expansion and conraction of each particle of the Si alloy during charge and discharge of the lithium ion secondary battery can be reduced, and deterioration due to non-uniformity such as crystal grain boundaries and defects hardly occurs. As a result, cycle characteristics such as capacity retention ratio of the lithium ion secondary battery are improved. If the median diameter of silicon is too large, grain boundaries and interfaces increase, and thus in addition to the increase of heterogeneous reaction in the particle, segregation of side reaction products and the like are observed more often. In the present invention, the median diameter (D50) is determined based on volume-based particle diameter distribution by laser diffraction/scattering type particle size distribution measurement.

The silicon alloy having a median diameter of 1.2 µm or less may be prepared by a chemical synthesis method or may be obtained by pulverizing a coarse silicon compound (for example, silicon having the size of about 10 to 100 µm). The pulverization can be carried out by a conventional method, for example, using a conventional pulverizing machine such as a ball mill and a hammer mill or pulverizing means.

The negative electrode of the present example embodiment preferably comprises a silicon alloy being crystalline and having a median diameter of 1.2 µm or less. Herein, such silicon alloy is also referred to as "Si alloy (a)". When the negative electrode comprises the Si alloy (a), a lithium ion secondary battery having high capacity and excellent cycle characteristics can be formed.

The specific surface area (CS) of the Si alloy (a) is preferably 1 $m^2/cm^3$ or more, more preferably 5 $m^2/cm^3$ or more, further preferably 10 $m^2/cm^3$ or more. The specific surface area (CS) of the Si alloy (a) is preferably 300 $m^2/cm^3$ or less. Herein, CS (Calculated Specific Surfaces Area) means a specific surface area (unit: $m^2/cm^3$) assuming that particles are spheres.

The surface of the Si alloy (a) may be partially or entirely covered with silicon oxide. The Si alloy (a) may be used in one type alone, or in two or more types in combination.

The amount of the Si alloy (a) based on the total weight of the negative electrode active material is preferably 65% by weight or more, more preferably 80% by weight or more, further preferably 90% by weight or more, still more preferably 93% by weight or more, and may be 100% by weight. When the amount of the Si alloy (a) is 65% by weight or more, a high negative electrode capacity can be obtained. When the amount of the silicon alloy having a small median diameter is large, aggregation of the silicon alloy easily occurs and a part of silicon alloys may not contribute to charge and discharge, leading to the reduction in cycle characteristics in some cases. However, the present inventors have found that even when Si alloy (a) having a small median diameter of 1.2 µm or less is used in the negative electrode active material in an amount of 65% by weight or more, the amount of the negative electrode binder of 12% by weight or more and more preferably 15% by weight or more makes it possible to provide a secondary battery excellent in cycle characteristics.

As one aspect of the present example embodiment, the negative electrode active material may comprise graphite (also referred to as "auxiliary material") in addition to the Si alloy (a). The type of the graphite in the negative electrode active material is not particularly limited, but examples thereof may include natural graphite and artificial graphite, and may include two or more types among them. The shape of the graphite may be, for example, spherical, massive or the like. Graphite has high electrical conductivity and is excellent in adhesion to a current collector made of metal and in flatness of voltage. If graphite is included, the influence of the expansion and contraction of the Si alloy during charge and discharge of the lithium ion secondary battery may be reduced and the cycle characteristics of the lithium ion secondary battery may be improved in some cases.

The median diameter (D50) of the graphite is not particularly limited, but is preferably 1 μm or more, more preferably 3 μm or more, further preferably 5 μm or more, and preferably 20 μm or less, more preferably 15 μm or less.

The specific surface area of the graphite is not particularly limited, but, for example, the BET specific surface area thereof is preferably 0.5 to 9 $m^2/g$, and more preferably 0.8 to 5 $m^2/g$.

The crystalline structure of the graphite is not particularly limited as long as it is capable of absorbing and desorbing lithium ions. For example, a plane gap d (002) may be preferably about 0.3354 to 0.34 nm, more preferably about 0.3354 to 0.338 nm.

As Raman bands of graphite by Raman spectroscopy of graphite particles, G band (around 1580 to 1600 $cm^{-1}$) corresponding to the in-plane vibration mode and D band (around 1360 $cm^{-1}$) derived from in-plane defects are observed. When these peak intensities respectively represent $I_G$ and $I_D$, a high peak intensity ratio of $I_G/I_D$ means that the degree of graphitization is high. Raman spectroscopic characteristics of the graphite particles used in the present example embodiment are not particularly limited, but, for example, it is preferable that $I_G/I_D$ is 2 or more and 11 or less.

The amount of graphite based on the total weight of the negative electrode active material is not particularly limited, but is preferably 2% by weight or more, more preferably 5% by weight or more, and preferably 35% by weight or less, more preferably 25% by weight or less, still more preferably 15% by weight or less, and may be 0% by weight.

The negative electrode active material may comprise other negative electrode active materials other than the above materials as long as the effects of the present invention can be achieved. The other negative electrode active materials may include, for example, a material comprising silicon as a constituent element (except for a crystalline silicon alloy having a median diameter of 1.2 μm or less; hereinafter, also referred to as "other silicon materials"). Examples of other silicon materials include a metal silicon (elemental silicon) and a silicon oxide represented by the formula: $SiO_x$ (0<x≤2). The median diameter of other silicon materials is not particularly limited, but is preferably 0.1 μm or more and 10 μm or less, more preferably 0.2 μm or more and 8 μm or less.

In one aspect of the present example embodiment, other silicon materials may preferably comprise a silicon oxide. When other silicon materials comprises a silicon oxide, localized stress concentration in the negative electrode can be reduced as disclosed in for example, Japanese Patent No. 3982230. The amount of the silicon oxide may be about several ppm based on the total weight of the negative electrode active material, but is preferably 0.2% by weight or more, and preferably 5% by weight or less, more preferably 2% by weight or less, and may be 0% by weight. The median diameter of the silicon oxide is not particularly limited, but is preferably, for example, about 0.5 to 9 μm. If the particle size is too small, the reactivity with the electrolyte solution or the like increases, resulting in that the life characteristics may decrease in some cases. If the particle size is too large, cracking of the particles easily occurs during absorbing and desorbing Li, resulting in that the life may be shortened.

Other negative electrode active materials may comprise a silicon alloy other than the Si alloy (a), that is, may comprise a silicon alloy having a median diameter of more than 1.2 μm or an amorphous silicon alloy as long as the effects of the present invention can be achieved. The amount of these in the negative electrode active material is preferably 5% by weight or less, more preferably 3% by weight or less, and may be 0% by weight.

Other negative electrode active materials may comprise a carbon material other than graphite as long as the effects of the present invention are not impaired. Examples of the carbon material include amorphous carbon, graphene, diamond-like carbon, and a composite thereof, and the amount of these in the negative electrode active material is preferably 5% by weight or less, and may be 0% by weight.

Examples of other negative electrode active materials also include metals other than silicon and metal oxides. Examples of the metal include Li, Al, Ti, Pb, Sn, In, Bi, Ag, Ba, Ca, Hg, Pd, Pt, Te, Zn, La, and alloys of two or more of these. These metals or alloys may comprise one or more non-metallic elements. Examples of the metal oxide include aluminum oxide, tin oxide, indium oxide, zinc oxide, lithium oxide, a composite thereof or the like. One or or two or more element(s) selected from nitrogen, boron and sulfur may be added to the metal oxide, for example, in an amount of 0.1 to 5 mass %. This may improve the electrical conductivity of the metal oxide in some cases.

The amount of the negative electrode active material in the negative electrode mixture layer is preferably 45% by weight or more, more preferably 50% by weight or more, still more preferably 55% by weight or more, and preferably 88% by weight or less, more preferably 80% or less.

The negative electrode active material may comprise one type alone or two or more types.

(Negative Electrode Binder)

The negative electrode binder is not particularly limited, but for example, polyacrylic acid (also described as "PAA"), polyacrylic acid ester, styrene-butadiene rubber (SBR), polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamideimide, polystyrene, polyacrylonitrile and the like may be used. One type thereof may be used alone or two or more types thereof may be used in combination. A thickener such as carboxymethyl cellulose (CMC) may also be used in combination. Among these, from the viewpoint of excellent binding properties, it is preferable to comprise at least one selected from the group consisting of a combination of SBR and CMC, a polyacrylic acid and a polyimide, and more preferably comprise a polyacrylic acid.

The amount of the negative electrode binder based on the total weight of the negative electrode mixture layer is preferably 12% by weight or more, more preferably 15% by weight or more, still more preferably 20% by weight or more, further preferably 25% by weight or more, still more further preferably 30% by weight or more, still more further preferably 35% by weight or more, particularly preferably 40% by weight or more, and preferably 50% by weight or less, and more preferably 45% by weight or less. In one aspect of the present example embodiment, the Si alloy (a) being crystalline and having a median diameter of 1.2 μm or less is used as the negative electrode active material. If the amount of the Si alloy (a) having a small particle size is large (for example, the amount of the Si alloy in the negative electrode active material is 65% by weight or more), the problem that powder falling increases and cycle characteristics of the secondary battery easily deteriorate usually occurs. However, when the amount of the negative electrode binder is 12% by weight or more and preferably 15% by weight or more, powder falling of the Si alloy can be suppressed, so that deterioration in cycle characteristics of the secondary battery can be suppressed. Moreover, when the amount of the negative electrode binder is 50% by weight or less, a decrease in energy density of the negative electrode can be suppressed.

Hereinafter, as one preferable aspect of the present example embodiment, polyacrylic acid (PAA) as a negative electrode binder will be described in detail, but the present invention is not limited thereto.

The polyacrylic acid comprises a (meth)acrylic acid monomer unit represented by the following formula (11). In the present specification, the term "(meth)acrylic acid" means acrylic acid and/or methacrylic acid.

(11)

wherein in formula (11), $R_1$ is a hydrogen atom or a methyl group.

The carboxylic acid in the monomer unit represented by the formula (11) may be a carboxylic acid salt such as a metal salt of a carboxylic acid. The metal is preferably a monovalent metal. Examples of the monovalent metal include alkali metals (for example, Na, Li, K, Rb, Cs, Fr and the like) and noble metals (for example, Ag, Au, Cu and the like), and Na and K are preferred, and Na is more preferred. When the polyacrylic acid comprises a carboxylic acid salt in at least a part of the monomer units, the adhesion to the constituent material of the electrode mixture layer may be further improved in some cases.

The polyacrylic acid may comprise other monomer units. When the polyacrylic acid further comprises monomer units other than the (meth)acrylic acid monomer unit, the peel strength between the electrode mixture layer and the current collector may be improved in some cases. As other monomer units, monomer units derived from monomers including ethylenically unsaturated carboxylic acids including monocarboxylic acid compounds such as crotonic acid and pentenoic acid, dicarboxylic acid compounds such as itaconic acid and maleic acid, sulfonic acid compounds such as vinyl sulfonic acid, and phosphonic acid compounds such as vinyl phosphonic acid; aromatic olefins having acidic groups such as styrene sulfonic acid and styrene carboxylic acid; (meth) acrylic acid alkyl esters; acrylonitrile; aliphatic olefins such as ethylene, propylene and butadiene; aromatic olefins such as styrene may be exemplified. Other monomer unit(s) may be a monomer unit constituting a known polymer used as a binder for a secondary battery. In these monomer units, if present, the acids may be also replaced with their salts.

Furthermore, in the polyacrylic acid, at least one hydrogen atom in the main chain and side chain may be substituted with halogen (fluorine, chlorine, boron, iodine and the like).

When the polyacrylic acid is a copolymer comprising two or more kinds of monomer units, the copolymers may be a random copolymer, an alternating copolymer, a block copolymer, a graft copolymer and the like, or combinations thereof.

The molecular weight of the polyacrylic acid is not particularly limited, but the weight-average molecular weight is preferably 1000 or more, more preferably in the range of 10,000 to 5,000,000, and particularly preferably in the range of 300,000 to 350,000. When the weight-average molecular weight is within the above range, good dispersibility of the active material and the conductive assistant agent can be maintained and excessive increase in slurry viscosity can be suppressed.

In general, an active material having a large specific surface area requires a large amount of a binder, but the polyacrylic acid has high binding ability even in a small amount. Therefore, when the polyacrylic acid is used as the negative electrode binder, the increase in resistance due to the binder is small even for the electrode comprising an active material having a large specific surface area. Since the specific surface area of the negative electrode of the present example embodiment is increased by comprising a negative electrode active material of a Si alloy having a small particle size, it is preferable to use polyacrylic acid as the negative electrode binder. In addition, the binder comprising the polyacrylic acid is excellent in reducing the irreversible capacity of the battery, increasing the capacity of the battery and improving the cycle characteristics.

For the purpose of reducing the impedance, the negative electrode may additionally comprise an electrically conductive assistant agent. Examples of the additional conductive assistant agent include flake-like or fibrous carbonaceous fine particles, for example, carbon black, acetylene black, Ketjen black, vapor grown carbon fiber, and the like. The amount of the electrically conductive assistant agent in the negative electrode mixture layer may be 0% by weight, but is preferably, for example, 0.5 to 5% by weight.

As the negative electrode current collector, aluminum, nickel, stainless steel, chromium, copper, silver, iron, manganese, molybdenum, titanium, niobium and alloys thereof are preferred from the viewpoint of electrochemical stability. Examples of its shape include foil, a flat plate shape, and a mesh shape. Among these, stainless steel foil, electrolytic copper foil, and high-strength current collector foil such as rolled copper foil and clad current collector foil are particularly preferable. The clad current collector foil preferably contains copper.

In the present example embodiment, the capacity per mass of the negative electrode mixture layer (initial lithium storage amount at 0 V to 1 V when lithium metal is used as a counter electrode) is preferably 1500 mAh/g or more, and, but is not particularly limited to, preferably 4200 mAh/g or less. In this specification, the capacity of the negative electrode mixture layer is calculated based on the theoretical capacity of the negative electrode active material.

The density of the negative electrode mixture layer of the negative electrode of the present example embodiment is not particularly limited, but is preferably 0.4 g/cm³ or more, more preferably 1 g/cm³ or more and further preferably 1.2 g/cm³ or more, and is preferably 1.4 g/cm³ or less, more preferably less than 1.35 g/cm³. When the density of the negative electrode mixture layer is within the above range, a lithium ion secondary battery having high energy density and excellent cycle characteristics can be obtained. There is a case where the step of compression molding by roll pressing or the like is not required in the process of manufacturing the negative electrode to make the density of the negative electrode mixture layer of the negative electrode within the above range, and in this case, the manufacturing cost of the negative electrode can be reduced.

The negative electrode may be produced according to a usual method. In one embodiment, first, a negative electrode active material, a negative electrode binder, and an optional component such as an electrically conductive assistant agent are mixed in a solvent to prepare a slurry. Preferably, in each step, slurry is prepared by mixing by a V-type mixer (V blender), mechanical milling, or the like in a stepwise manner. Subsequently, the prepared slurry is applied to a negative electrode current collector and dried to prepare a negative electrode in which a negative electrode mixture layer is formed on the negative electrode current collector, and then, if necessary, compression molding is performed by a roll press or the like. Applying may be carried out by a doctor blade method, a die coater method, a reverse coater method, or the like.

<Positive Electrode>

The positive electrode may have a structure in which a positive electrode mixture layer comprising a positive electrode active material is formed on a positive electrode current collector. A positive electrode of the present example embodiment comprises, for example, a positive electrode current collector formed of a metal foil or the like and a positive electrode mixture layer formed on one surface or both surfaces of the positive electrode current collector. The positive electrode mixture layer is formed so as to cover the positive electrode current collector with a positive electrode binder. The positive electrode current collector is arranged to have an extended portion connected to a positive electrode terminal, and the positive electrode mixture layer is not formed on the extended portion. Here, in the present specification, the "positive electrode mixture layer" refers to a portion of the members constituting the positive electrode excluding the positive electrode current collector, and comprises a positive electrode active material and a positive electrode binder, and if necessary, may comprise an additive such as a electrically conductive assistant agent and the like. The positive electrode active material is a material capable of absorbing and desorbing lithium. In this specification, a substance that does not absorb and desorb lithium, such as a binder, is not included in the positive electrode active material.

The positive electrode active material is not particularly limited as long as the material can absorb and desorb lithium, and may be selected from several viewpoints. From the viewpoint of achieving higher energy density, a high capacity compound is preferably contained. Examples of the high capacity compound include Li-rich layered positive electrode, lithium nickelate (LiNiO$_2$), and a lithium nickel composite oxide in which a part of the Ni of lithium nickelate is replaced by another metal element, and a Li-rich layered positive electrode represented by the following formula (A1) and a layered lithium nickel composite oxide represented by the following formula (A2) are preferred.

$$Li(Li_xM_{1-x-z}Mn_z)O_2 \qquad (A1)$$

wherein in formula (A1), 0.1≤x<0.3, 0.4≤z≤0.8, M is at least one of Ni, Co, Fe, Ti, Al, and Mg;

$$Li_yNi_{(1-x)}M_xO_2 \qquad (A2)$$

wherein in formula (A2), 0≤x<1, 0<y≤1, M is at least one element selected from the group consisting of Li, Co, Al, Mn, Fe, Ti, and B.

From the viewpoint of high capacity, it is preferred that the content of Ni is high, that is, x is less than 0.5, further preferably 0.4 or less in the formula (A2). Examples of such compounds include Li$_\alpha$Ni$_\beta$Co$_\gamma$Mn$_\delta$O$_2$ (0<α≤1.2, preferably 1≤α≤1.2, α+β+γ+δ=2, β≥0.7, and γ≤0.2) and Li$_\alpha$Ni$_\beta$Co$_\gamma$Al$_\delta$O$_2$ (0<α≤1.2, preferably 1≤α≤1.2, α+β+γ+δ=2, β≥0.6, preferably β≥0.7, and γ≤0.2) and particularly include LiNi$_\beta$Co$_\gamma$Mn$_\delta$O$_2$ (0.75≤β≤0.85, 0.05≤γ≤0.15, and 0.10≤δ≤0.20, β+γ+δ=1). More specifically, for example, LiNi$_{0.8}$Co$_{0.05}$Mn$_{0.15}$O$_2$, LiNi$_{0.8}$Co$_{0.1}$Mn$_{0.1}$O$_2$, LiNi$_{0.8}$Co$_{0.15}$Al$_{0.05}$O$_2$, and LiNi$_{0.8}$Co$_{0.1}$Al$_{0.1}$O$_2$ may be preferably used.

From the viewpoint of thermal stability, it is also preferred that the content of Ni does not exceed 0.5, that is, x is 0.5 or more in the formula (A2). In addition, it is also preferred that particular transition metals do not exceed half. Examples of such compounds include Li$_\alpha$Ni$_\beta$Co$_\gamma$Mn$_\delta$O$_2$ (0<α≤1.2, preferably 1≤α≤1.2, α+β+γ+δ=2, 0.2≤β≤0.5, 0.1≤γ≤0.4, and 0.1≤δ≤0.4). More specific examples may include LiNi$_{0.4}$Co$_{0.3}$Mn$_{0.3}$O$_2$ (abbreviated as NCM433), LiNi$_{1/3}$Co$_{1/3}$Mn$_{1/3}$O$_2$, LiNi$_{0.5}$Co$_{0.2}$Mn$_{0.3}$O$_2$ (abbreviated as NCM523), and LiNi$_{0.5}$Co$_{0.3}$Mn$_{0.2}$O$_2$ (abbreviated as NCM532) (also including those in which the content of each transition metal fluctuates by about 10% in these compounds).

In addition, two or more compounds represented by the formula (A2) may be mixed and used, and, for example, it is also preferred that NCM532 or NCM523 and NCM433 are mixed in the range of 9:1 to 1:9 (as a typical example, 2:1) and used. Further, by mixing a material in which the content of Ni in formula (A2) is high (x is 0.4 or less) and a material in which the content of Ni in formula (A2) does not exceed 0.5 (x is 0.5 or more, for example, NCM433), a battery having high capacity and high thermal stability can also be formed.

As the positive electrode active material other than the above, for example, lithium manganates having a layered structure or a spinel structure, such as LiMnO$_2$, Li$_x$Mn$_2$O$_4$ (0<x<2), Li$_2$MnO$_3$, and Li$_x$Mn$_{1.5}$Ni$_{0.5}$O$_4$ (0<x<2); LiCoO$_2$, or materials in which a part of such transition metals is substituted with other metal(s); materials having Li in an excessive amount as compared with the stoichiometric composition in these lithium transition metal oxides; and materials having an olivine structure such as LiFePO$_4$ may be exemplified. Further, materials obtained by substituting a part of these metal oxides with Al, Fe, P, Ti, Si, Pb, Sn, In, Bi, Ag, Ba, Ca, Hg, Pd, Pt, Te, Zn, La, or the like may also be used. Such positive electrode active materials described above may be used alone, or in combination of two or more thereof.

Examples of a positive electrode binder include, but are not limited to, polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamideimide, polyacrylic acid and the like. Styrene-butadiene rubber (SBR) or the like may be used. When an aqueous binder such as an SBR emulsion is used, a thickener such as carboxymethyl cellulose (CMC) may also be used. The positive electrode binder may be used by mixing two or more kinds. From the viewpoint of a trade-off relationship between "sufficient binding force" and "high energy density", the amount of the positive electrode binder is preferably 2 to 10 parts by mass based on 100 parts by mass of the positive electrode active material.

To the coating layer comprising the positive electrode active material, an electrically conductive assistant agent may be added for the purpose of reducing the impedance. Examples of the electrically conductive assistant agent include flake-like or fibrous carbonaceous fine particles, such as graphite, carbon black, acetylene black and vapor grown carbon fiber.

As the positive electrode current collector, from the viewpoint of electrochemical stability, aluminum, nickel, copper, silver, iron, chromium, manganese, molybdenum, titanium, niobium, and alloys thereof are preferable. Examples of its shape include foil, a flat-plate shape, and a mesh shape. In particular, a current collector using aluminum, an aluminum alloy, or iron-nickel-chromium-molybdenum-based stainless steel is preferable.

The positive electrode may be prepared by forming the positive electrode mixture layer comprising the positive electrode active material and the positive electrode binder on the positive electrode current collector. Examples of a method of forming the positive electrode mixture layer include a doctor blade method, a die coater method, a CVD method, a sputtering method, and the like. It is also possible that after forming the positive electrode mixture layer in advance, a thin film of aluminum, nickel or an alloy thereof as a positive electrode current collector is formed thereon by a method such as vapor deposition or sputtering.

In the present example embodiment, it may be preferred in some cases that the capacity ratio represented by (capacity per unit area of the negative electrode/capacity per unit area of the positive electrode) in the configuration of the negative electrode and the positive electrode that are arranged to face each other via the separator is preferably more than 1:1 and preferably 2 or less. When the capacity ratio is within the above range, a secondary battery excellent in cycle characteristics can be obtained.

<Electrolyte Solution>

The electrolyte solution (non-aqueous electrolyte solution) is not particularly limited, but for example, a solution in which a supporting salt is dissolved in a non-aqueous solvent may be used.

As the solvent for the electrolyte solution, a nonaqueous solvent that is stable at the operating potential of the battery is preferable. Examples of the non-aqueous solvent include aprotic organic solvents including cyclic carbonates such as propylene carbonate (PC), ethylene carbonate (EC), fluoroethylene carbonate (FEC) and butylene carbonate (BC); open-chain carbonates such as dimethyl carbonate (DMC), diethyl carbonate (DEC), ethyl methyl carbonate (EMC) and dipropyl carbonate (DPC); propylene carbonate derivatives; aliphatic carboxylic acid esters such as methyl formate, methyl acetate and ethyl propionate; ethers such as diethyl ether and ethyl propyl ether; and fluorinated aprotic organic solvents in which at least a part of the hydrogen atoms of these compounds is(are) substituted with fluorine atoms.

Among these, the non-aqueous solvent preferably comprises cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (MEC) and dipropyl carbonate (DPC).

The non-aqueous solvent may be used alone, or two or more types may be used in combination.

(Supporting Salt)

The supporting salt is not particularly limited as long as it contains Li. Examples of the supporting salt include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_2$, $LiB_{10}Cl_{10}$ and a compound represented by the following formula (b):

$$LiN(SO_2C_nF_{2n+1})_2 \text{ (}n\text{ is an integer of 0 or more)} \quad \text{formula (b).}$$

Examples of the compound represented by the formula (b) include $LiN(FSO_2)_2$ (abbreviated as LiFSI), $LiN(CF_3SO_2)_2$, $LiN(C_2F_5SO_2)_2$. In addition, examples of other supporting salts include lithium lower aliphatic carboxylates, chloroborane lithium, lithium tetraphenylborate, LiBr, LiI, LiSCN, and LiCl. Among these, $LiPF_6$ and LiFSI are particularly preferable from the viewpoint of oxidation resistance, reduction resistance, stability, ease of dissolution and the like, and $LiPF_6$ is preferable from the viewpoint of cost reduction. The supporting salt may be used alone, or two or more supporting salts may be used in combination. The content of the supporting salt (the total content when plural supporting salts are comprised) in 1 L of a non-aqueous solvent is preferably 0.4 mol or more and 1.5 mol or less, and more preferably 0.5 mol or more and 1.2 mol or less.

The electrolyte solution may further comprise other additives. Examples of other additives include, but not particularly limited to, a fluorinated cyclic carbonate such as 4-fluoro-1,3-dioxolan-2-one (FEC). Addition of these compounds may further improve the cycle characteristics of the battery in some cases. It is presumed that these additives are decomposed during charge and discharge of the lithium ion secondary battery to form a film on the surface of the electrode active material and suppress decompositions of the electrolyte solution and the supporting salt.

The amount of these additives in the electrolyte solution (the total amount thereof when the electrolyte solution comprises plural types) is not particularly limited, and may be 0% by weight, but is preferably 0.01% by weight or more and 10% by weight or less to the total weight of the electrolyte solution. When the amount is 0.01% by weight or more, a sufficient film effect can be achieved. When the amount is 10% by weight or less, an increase in the viscosity of the electrolyte solution and an accompanying increase in resistance can be suppressed.

<Separator>

The separator may be of any type as long as it suppresses electric conduction between the positive electrode and the negative electrode, does not inhibit the permeation of charged substances, and has durability against the electrolyte solution. Specific examples of the materials include polyolefins such as polypropylene and polyethylene; cellulose, polyethylene terephthalate, polyimide, polyvinylidene fluoride; and aromatic polyamides (aramid) such as polymetaphenylene isophthalamide, polyparaphenylene terephthalamide and copolyparaphenylene-3,4'-oxydiphenylene terephthalamide; and the like. These may be used as a porous film, a woven fabric, a nonwoven fabric and the like.

<Insulation Layer>

An insulation layer may be formed on at least one surface of the positive electrode, the negative electrode and the separator. Examples of a method for forming the insulation layer include a doctor blade method, a dip coating method, a die coater method, a CVD method, a sputtering method and the like. The insulation layer may be formed at the same time as forming the positive electrode, the negative electrode, or the separator. Examples of materials constituting the insulation layer include a mixture of aluminum oxide, barium titanate or the like and SBR or PVDF.

<Structure of Lithium Ion Secondary Battery>

Figure 2:
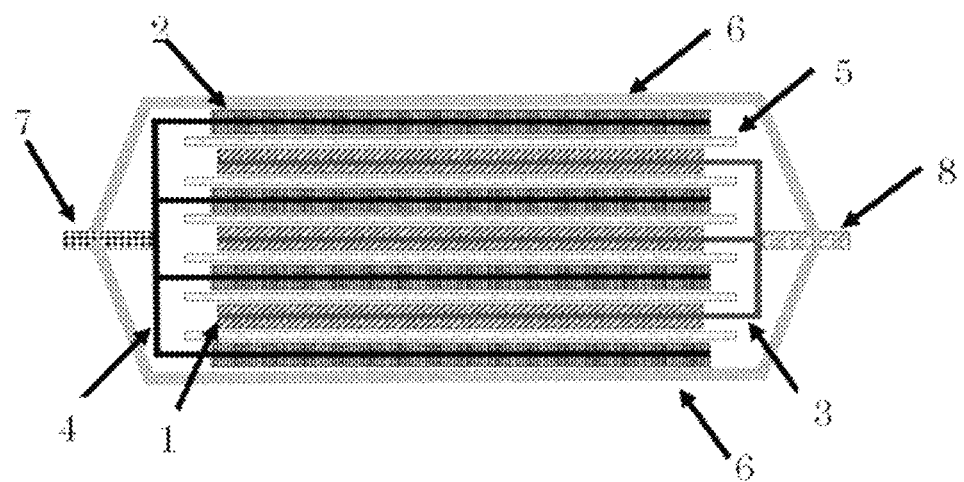
FIG. 2 is a schematic sectional view showing a structure of an electrode element of a stacking laminate type secondary battery according to one example embodiment of the present invention.

FIG. 1 shows a laminate-type secondary battery as an example of a secondary battery according to the present example embodiment. The separator 5 is sandwiched between a positive electrode comprising a positive electrode mixture layer 1 containing a positive electrode active material and a positive electrode current collector 3 and a negative electrode comprising a negative electrode mixture layer 2 and a negative electrode current collector 4. The positive electrode current collector 3 is connected to the positive electrode lead terminal 8 and the negative electrode current collector 4 is connected to the negative electrode lead terminal 7. The exterior laminate 6 is used for the outer package, and the interior of the secondary battery is filled with an electrolyte solution. The electrode element (also referred to as "battery element" or "electrode laminate") preferably has a structure in which a plurality of positive electrodes and a plurality of negative electrodes are stacked via separators, as shown in FIG. 2.

Examples of the laminate resin film used in a laminate type include aluminum, aluminum alloy, titanium foil and the like. Examples of the material of the thermally bondable portion of the metal laminate resin film include thermoplastic polymer materials, such as polyethylene, polypropylene, and polyethylene terephthalate. In addition, each of the numbers of the metal laminate resin layers and the metal foil layers is not limited to one and may be two or more.

Figure 3:
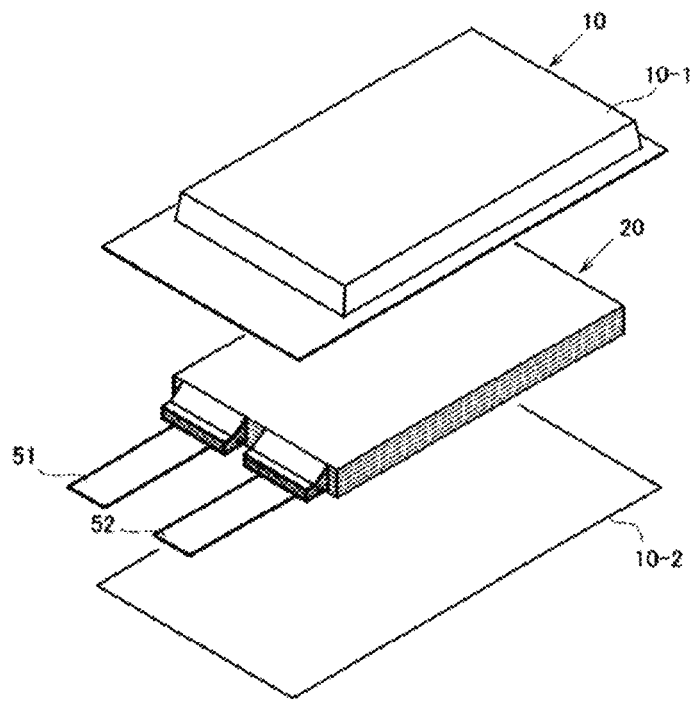
FIG. 3 is an exploded perspective view showing a basic structure of a film-packaged battery.
Figure 4:
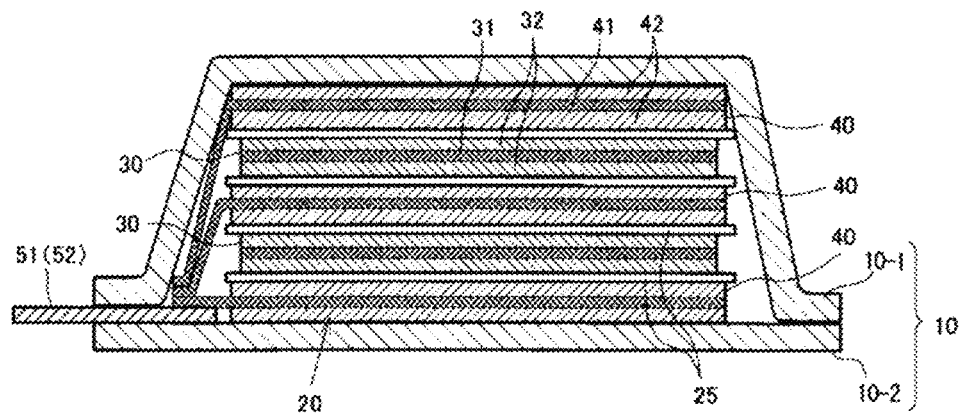
FIG. 4 is a sectional view schematically showing a section of the battery in FIG. 3.

As another embodiment, a secondary battery having a structure as shown in FIG. 3 and FIG. 4 may be provided. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 4. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

In the secondary battery in FIG. 1, the electrode tabs are drawn out on both sides of the package, but a secondary battery to which the present invention may be applied may have an arrangement in which the electrode tabs are drawn out on one side of the outer package as shown in FIG. 3. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 4). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 3, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 3 and FIG. 4, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

<Method for Manufacturing Lithium Ion Secondary Battery>

The lithium ion secondary battery according to the present example embodiment can be manufactured according to a usual method. An example of a method for manufacturing a lithium ion secondary battery will be described taking a stacked laminate type lithium ion secondary battery as an example. First, in the dry air or an inert atmosphere, the positive electrode and the negative electrode are placed to oppose to each other via a separator to form the electrode element. Next, this electrode element is accommodated in an outer package (container), an electrolyte solution is injected, and the electrode is impregnated with the electrolyte solution. Thereafter, the opening of the outer package is sealed to complete the lithium ion secondary battery.

<Assembled Battery>

A plurality of lithium ion secondary batteries according to the present example embodiment may be combined to form an assembled battery. The assembled battery may be configured by connecting two or more lithium ion secondary batteries according to the present example embodiment in series or in parallel or in combination of both. The connection in series and/or parallel makes it possible to adjust the capacitance and voltage freely. The number of lithium ion secondary batteries included in the assembled battery can be set appropriately according to the battery capacity and output.

<Vehicle>

The lithium ion secondary battery or the assembled battery according to the present example embodiment can be used in vehicles. Examples of the vehicle according to an example embodiment of the present invention include hybrid vehicles, fuel cell vehicles, electric vehicles (besides four-wheel vehicles (cars, trucks, commercial vehicles such as buses, light automobiles, etc.), two-wheeled vehicle (bike) and tricycle), and the like. The vehicles according to the present example embodiment are not limited to automobiles, and the batteries may be used in a variety of power sources of other vehicles, such as a moving body like a train.

EXAMPLES

Hereinafter, an embodiment of the present invention will be explained in details by using examples, but the present invention is not limited to these examples.

Abbreviations used in the following Examples will be described.

SBR: styrene-butadiene rubber
PAA: polyacrylic acid
CB: carbon black
flake: flake-like graphite
KB: Ketjen black
CNT: carbon nanotube
EC: ethylene carbonate
DEC: diethyl carbonate
MEC: methyl ethyl carbonate
FEC: fluoroethylene carbonate (4-fluoro-1,3-dioxolan-2-one)
SUS foil: stainless steel foil
High strength Cu foil: High strength copper clad foil

Example A1

The production of the battery of this example will be described.

(Negative Electrode)

A crystalline silicon alloy (alloy of silicon and boron, weight ratio is silicon:boron=99:1, median diameter: 1 μm, crystallite size: 100 nm) as a negative electrode active material and SBR as a negative electrode binder were weighed so that a weight ratio thereof was 85:15. They were kneaded with distilled water to obtain a slurry for the negative electrode mixture layer. The prepared negative electrode slurry was applied to one surface of a SUS foil having a thickness of 10 μm as a current collector so as to be a coating weight of 1 mg/cm$^2$, drided, cut, further pressed, and punched out into a circular shape having a diameter of 12 mm to obtain a negative electrode. The density of the negative electrode mixture layer was 1.3 g/cc. The 1C current value when using this negative electrode is about 3 mAh.

The capacity of the negative electrode mixture layer may be calculated as follows. When the electrode was punched out into a circular shape with a diameter of 12 mm and the negative electrode active material was applied to one surface of the electrode so as to be a coating weight of 1 mg/cm$^2$, the initial charge capacity was follows. For example, if the capacity of the negative electrode active material is 3000 mAh/g and the content of the negative electrode active material in the negative electrode mixture layer is 85% by weight, the negative electrode capacity excluding the binder (i.e. the capacity of the negative electrode mixture layer) is 3000 (mAh/g)×85/100=2550 (mAh/g). Therefore, the initial charge capacity is 2550 (mAh/g)×1 mg/cm$^2$×(12 mm×0.5)$^2$×Π=2.9 (mAh).

(Production of the Battery)

A half cell having lithium metal as a counter electrode was produced with using the obtained negative electrode. A mixed solvent of EC, DEC, and MEC (volume ratio: EC/DEC/MEC=3/5/2) comprising 1.0 mol/l of LiPF$_6$ was used as the electrolyte solution.

(Evaluation of Battery)

At a temperature of 25° C., CCCV charge was performed to 0 V at a current value of 0.5 C as a charge, and CC discharge was performed to 1V at a current value of 0.5 C as a discharge. The charge and discharge was repeated 50 times, and the capacity retention ratio after 50 cycles was calculated by the following formula:

{(discharge capacity after 50 cycles)/(discharge capacity after 1 cycle)}×100 (unit: %).

Table 1 shows the results.

Examples 2 to 21, Comparative Examples 1 to 5

A battery was prepared and evaluated in the same manner as in Example 1 except that the compositions of the negative electrode and the electrolyte solution were changed as described in Tables 1 and 2. As described in Tables 1 and 2, for the negative electrode active material, the type of the doping element in the Si alloy, the median diameter of the Si alloy, the amount of SiO particles (median diameter: 5 μm), the particle size and the amount of graphite as an auxiliary material were changed. All Si alloys were crystalline. In addition, the type and amount of the negative electrode binder, the type and amount of the negative electrode electrically conductive assistant agent, the type of the negative electrode current collector, and the additive in the electrolyte solution were changed as shown in Tables 1 and 2. As the graphite as a carbon auxiliary material, spherical artificial graphite particles having a particle diameter (median diameter) of 10 μm or 5 μm (d (002) value: 0.336 nm, G/D ratio ≥9) were used.

In Tables 1 and 2, the amount of each material constituting the negative electrode active material is the amount based on the total weight of the negative electrode active material, and the "amount of the negative electrode active material in the negative electrode mixture layer" is a weight ratio of the negative electrode active material to the total weight of the negative electrode mixture layer (i.e. the total weight of the negative electrode active material, the negative electrode binder and the negative electrode electrically conductive assistant agent). The amount of the negative electrode binder and the amount of the negative electrode electrically conductive assistant agent are respectively the contents of each material based on the total weight of the negative electrode mixture layer.

In the production of the negative electrode of the battery of each of Examples and Comparative Examples, when the negative electrode comprises SiO particles, graphite as an auxiliary material and/or an electrically conductive assistant agent, these were mixed together with a silicon alloy and a negative electrode binder so as to have the composition shown in Tables 1 and 2 to prepare a slurry for the negative electrode mixture layer. When the electrolyte solution comprises the additive of FEC, FEC was added so that the amount of FEC in the electrolyte solution of Example 1 was 10% by weight.

Figure 5:
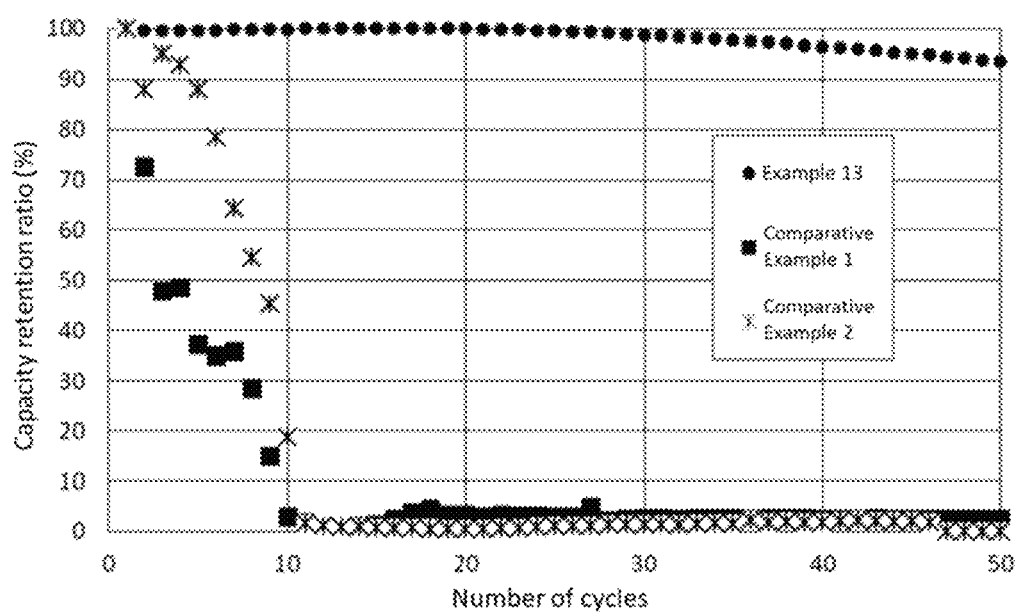
FIG. 5 is a graph showing the relationship between the number of charge and discharge cycles and the capacity retention ratio in Example 13, Comparative Example 1, and Comparative Example 2.

Tables 1 and 2 show the evaluation results of the batteries produced in the Examples and Comparative examples, respectively. FIG. 5 shows the relationship between the number of charge and discharge cycles and the capacity retention ratio for each of the batteries of Example 13, Comparative Example 1, and Comparative Example 2.

TABLE 1

| | negative electrode negative electrode mixture layer negative electrode active material | | | | | | |
|---|---|---|---|---|---|---|---|
| | Si alloy | | | SiO particle | auxiliary material | | amount of the negative electrode active material in the negative |
| | doping element | D50 | amount (wt %) | amount (wt %) | type | particle size (μm) | amount (wt %) | electrode mixture layer (wt %) |
| Ex. 1 | B | 1 | 100 | 0 | — | — | 0 | 85 |
| Ex. 2 | B | 1 | 100 | 0 | — | — | 0 | 85 |
| Ex. 3 | B | 0.5 | 100 | 0 | — | — | 0 | 85 |
| Ex. 4 | B | 0.5 | 100 | 0 | — | — | 0 | 85 |
| Ex. 5 | B | 0.5 | 100 | 0 | — | — | 0 | 83 |

TABLE 1-continued

| | | | | | | | | | |
|---|---|---|---|---|---|---|---|---|---|
| Ex. 6 | B | 0.5 | 95 | 0 | graphite | 10 | 5 | | 83 |
| Ex. 7 | B | 0.5 | 94 | 1 | graphite | 10 | 5 | | 83 |
| Ex. 8 | B | 0.5 | 94 | 1 | graphite | 10 | 5 | | 78 |
| Ex. 9 | B | 0.5 | 94 | 1 | graphite | 10 | 5 | | 73 |
| Ex. 10 | B | 0.5 | 94 | 1 | graphite | 10 | 5 | | 68 |
| Ex. 11 | B | 0.5 | 94 | 1 | graphite | 10 | 5 | | 63 |
| Ex. 12 | B | 0.5 | 94 | 1 | graphite | 10 | 5 | | 58 |
| Ex. 13 | B | 0.5 | 94 | 1 | graphite | 5 | 5 | | 58 |
| Ex. 14 | B | 0.5 | 94 | 1 | graphite | 5 | 5 | | 58 |
| Ex. 15 | B | 0.5 | 94 | 1 | graphite | 5 | 5 | | 58 |
| Ex. 16 | B | 0.5 | 94 | 1 | graphite | 5 | 5 | | 58 |
| Ex. 17 | B | 0.5 | 94 | 1 | graphite | 5 | 5 | | 58 |
| Ex. 18 | B | 0.5 | 94 | 1 | graphite | 5 | 5 | | 58 |
| Ex. 19 | P | 0.5 | 94 | 1 | graphite | 5 | 5 | | 58 |
| Ex. 20 | Al | 0.5 | 94 | 1 | graphite | 5 | 5 | | 58 |
| Ex. 21 | B | 0.5 | 94 | 1 | graphite | 5 | 5 | | 58 |

| | negative electrode | | | | | | |
|---|---|---|---|---|---|---|---|
| | negative electrode mixture layer | | | | | | |
| | negative electrode binder | | electrically conductive assistant agent | | negative electrode current collector | electrolyte solution additive | evaluation 50 cyc capacity retention ratio (%) |
| | type | amount (wt %) | type | amount (wt %) | | | |
| Ex. 1 | SBR | 15 | — | 0 | SUS foil | none | 51 |
| Ex. 2 | PAA | 15 | — | 0 | SUS foil | none | 66 |
| Ex. 3 | PAA | 15 | — | 0 | SUS foil | none | 67 |
| Ex. 4 | PAA | 15 | — | 0 | SUS foil | FEC | 79 |
| Ex. 5 | PAA | 15 | CB | 2 | SUS foil | FEC | 78 |
| Ex. 6 | PAA | 15 | CB | 2 | SUS foil | FEC | 81 |
| Ex. 7 | PAA | 15 | CB | 2 | SUS foil | FEC | 82 |
| Ex. 8 | PAA | 20 | CB | 2 | SUS foil | FEC | 90 |
| Ex. 9 | PAA | 25 | CB | 2 | SUS foil | FEC | 91.2 |
| Ex. 10 | PAA | 30 | CB | 2 | SUS foil | FEC | 91.5 |
| Ex. 11 | PAA | 35 | CB | 2 | SUS foil | FEC | 91.8 |
| Ex. 12 | PAA | 40 | CB | 2 | SUS foil | FEC | 92.2 |
| Ex. 13 | PAA | 40 | CB | 2 | SUS foil | FEC | 93.5 |
| Ex. 14 | PAA | 40 | flake | 2 | SUS foil | FEC | 92.9 |
| Ex. 15 | PAA | 40 | KB | 2 | SUS foil | FEC | 93.1 |
| Ex. 16 | PAA | 40 | CNT | 2 | electrolytic Cu foil | FEC | 93.9 |
| Ex. 17 | PAA | 40 | CNT | 2 | rolled Cu foil | FEC | 94.2 |
| Ex. 18 | PAA | 40 | CNT | 2 | high strength Cu foil | FEC | 95.3 |
| Ex. 19 | PAA | 40 | CNT | 2 | SUS foil | FEC | 94.5 |
| Ex. 20 | PAA | 40 | CNT | 2 | SUS foil | FEC | 94.9 |
| Ex. 21 | PAA | 40 | CNT | 2 | SUS foil | FEC | 95.4 |

Ex. = Example

TABLE 2

| | negative electrode negative electrode mixture layer negative electrode active material | | | | | | |
|---|---|---|---|---|---|---|---|
| | Si alloy | | SiO particle | auxiliary material particle | | | amount of the negative electrode active material in the negative electrode mixture layer (wt %) |
| | doping element | D50 | amount (wt %) | amount (wt %) | type | size (μm) | amount (wt %) | |
| Com. Ex. 1 | B | 5 | 100 | 0 | — | — | 0 | 85 |
| Com. Ex. 2 | B | 5 | 100 | 0 | — | — | 0 | 90 |
| Com. Ex. 3 | B | 5 | 100 | 0 | — | — | 0 | 80 |
| Com. Ex. 4 | B | 0.5 | 100 | 0 | — | — | 0 | 40 |

TABLE 2-continued

| | | | | | | | | |
|---|---|---|---|---|---|---|---|---|
| Com. Ex. 5 | B | 0.5 | 100 | 0 | — | — | 0 | 90 |

| | negative electrode | | | | | | evaluation 50 cyc capacity retention |
|---|---|---|---|---|---|---|---|
| | negative electrode mixture layer | | | | negative electrode current collector | electrolyte solution additive | |
| | negative electrode binder | | electrically conductive assistant agent | | | | |
| | type | amount (wt %) | type | amount (wt %) | | | ratio (%) |
| Com. Ex. 1 | SBR | 15 | — | 0 | SUS foil | none | 8 |
| Com. Ex. 2 | SBR | 10 | — | 0 | SUS foil | none | 4 |
| Com. Ex. 3 | PAA | 20 | — | 0 | SUS foil | none | 17 |
| Com. Ex. 4 | PAA | 60 | — | 0 | SUS foil | none | 35 |
| Com. Ex. 5 | PAA | 10 | — | 0 | SUS foil | none | 6 |

Com. Ex. = Comparative Example

In Comparative Examples 1 to 3, the capacity retentions were low because the median diameters of the Si alloys were large. This is presumably because when the median diameter of the Si alloy is large, the volume change accompanying the absorption and desorption of lithium is large, resulting in that the reaction in the negative electrode active material becomes uneven and problems such as crystal grain boundaries and defects easily occur and the capacity retention ratio is lowered. In Comparative Example 4, it is inferred that since the amount of the negative electrode binder was too large, the electron conductivity in the electrode mixture was insufficient, resulting in that the capacity retention ratio was lowered. In Comparative Examples 2 and 5, it is inferred that since the amount of the negative electrode binder was small, the adhesion between the negative electrode active materials was insufficient and the powder falling easily occurs, resulting in that the capacity retention ratio was lowered. On the other hand, in Examples 1 to 21, since the median diameter of the Si alloy was small and the amount of the negative electrode binder was within the range shown in Table 1, the capacity retention ratio was remarkably higher than that of Comparative Examples 1 to 5. As shown in Table 1, even when the type and the amount of the materials constituting the negative electrode were changed, additives were added to the electrolyte solution, or the like, good results were obtained as compared with the Comparative Examples.

The whole or part of the example embodiments disclosed above can be described as, but not limited to, the following supplementary notes.

(Supplementary Note 1)

A negative electrode for a lithium ion secondary battery comprising:

(i) a negative electrode mixture layer comprising a negative electrode active material and a negative electrode binder and (ii) a negative electrode current collector, wherein the negative electrode active material comprises an alloy comprising silicon (Si alloy), the Si alloy is crystalline and has a median diameter (D50 particle size) of 1.2 μm or less, and an amount of the negative electrode binder based on the weight of the negative electrode mixture layer is 12% by weight or more and 50% by weight or less.

(Supplementary Note 2)

The negative electrode for a lithium ion secondary battery according to the supplementary note 1, wherein the capacity of the negative electrode mixture layer is 1500 mAh/g or more.

(Supplementary Note 3)

The negative electrode for a lithium ion secondary battery according to the supplementary note 1 or 2, wherein the Si alloy content in the negative electrode active material is 65% by weight or more.

(Supplementary Note 4)

The negative electrode for a lithium ion secondary battery according to any one of the supplementary notes 1 to 3, wherein the negative electrode binder is at least one selected from a polyacrylic acid and a styrene-butadiene rubber.

(Supplementary Note 5)

The negative electrode for a lithium ion secondary battery according to any one of the supplementary notes 1 to 4, wherein the negative electrode current collector is a stainless foil, a rolled copper foil, or a clad current collector foil.

(Supplementary Note 6)

The negative electrode for a lithium ion secondary battery according to any one of the supplementary notes 1 to 5, wherein a density of the negative electrode mixture layer is less than 1.35 g/cc.

(Supplementary Note 7)

A lithium ion secondary battery comprising the negative electrode for a lithium ion secondary battery according to any one of the supplementary notes 1 to 6.

(Supplementary Note 8)

The lithium ion secondary battery according to the supplementary note 7, further comprising an electrolyte solution, wherein the electrolyte solution comprises 4-fluoro-1,3-dioxolan-2-one (FEC).

(Supplementary Note 9)

An assembled battery comprising the lithium ion secondary battery according to the supplementary note 7 or 8.

(Supplementary Note 10)

A vehicle comprising the lithium ion secondary battery according to the supplementary note 7 or 8.

(Supplementary Note 11)
A method of manufacturing a lithium ion secondary battery comprising:

stacking the negative electrode for a lithium ion secondary battery according to any one of the supplementary notes 1 to 6 and a positive electrode via a separator to prepare an electrode element, and enclosing the electrode element and an electrolyte solution in an outer package.

This application is based upon and claims the benefit of priority from Japanese patent application No. 2017-161133, filed on Aug. 24, 2017, the disclosure of which is incorporated herein in its entirety by reference.

While the invention has been particularly shown and described with reference to example embodiments (and examples) thereof, the invention is not limited to these embodiments (and examples). It will be understood by those of ordinary skill in the art that various changes in form and details may be made therein without departing from the spirit and scope of the present invention as defined by the claims.

INDUSTRIAL APPLICABILITY

The lithium ion secondary battery according to the present example embodiment can be utilized, for example, in various industrial fields that require for an electric power source and in an industrial field concerning transportation, storage and supply of electric energy. Specifically, it can be utilized for, for example, an electric power source of a mobile device such as a mobile phone and a notebook computer; an electric power source of a moving or transport medium including an electric vehicle such as an electric car, a hybrid car, an electric motorcycle and an electric power-assisted bicycle, a train, a satellite and a submarine; a back-up electric power source such as UPS; and an electric power storage device for storing an electric power generated by solar power generation, wind power generation; and the like.

EXPLANATION OF REFERENCE 1 positive electrode mixture layer
2 negative electrode mixture layer
3 positive electrode current collector
4 negative electrode current collector
5 separator
6 exterior laminate
7 negative electrode lead terminal
8 positive electrode lead terminal
10 film outer package
20 battery element
25 separator
30 positive electrode
40 negative electrode

The invention claimed is:

1. A lithium ion secondary battery, comprising:
a negative electrode;
a positive electrode; and
an electrolyte solution, wherein the negative electrode comprises:
(i) a negative electrode mixture layer comprising a negative electrode active material and a negative electrode binder; and
(ii) a negative electrode current collector,
the negative electrode active material comprises an alloy comprising silicon (Si alloy),
the Si alloy is crystalline and has a median diameter (D50 particle size) of 0.1 µm or more and 1.2 µm or less,
an amount of the negative electrode binder based on the weight of the negative electrode mixture layer is 12% by weight or more and 50% by weight or less,
the negative electrode binder comprises a polyacrylic acid, and
the electrolyte solution comprises 4-fluoro-1,3-dioxolan-2-one (FEC).

2. The lithium ion secondary battery according to claim 1, wherein the capacity of the negative electrode mixture layer is 1500 mAh/g or more.

3. The lithium ion secondary battery according to claim 1, wherein the Si alloy content in the negative electrode active material is 65% by weight or more.

4. The lithium ion secondary battery according to claim 1, wherein the negative electrode current collector is a stainless foil, a rolled copper foil, or a clad current collector foil.

5. The lithium ion secondary battery according to claim 1, wherein a density of the negative electrode mixture layer is less than 1.35 g/cc.

6. The lithium ion secondary battery according to claim 1, wherein the Si alloy comprises silicon and a non-silicon metal, and a content of the non-silicon metal in the Si alloy is 0.1 to 5 mass %.

7. An assembled battery comprising the lithium ion secondary battery according to claim 1.

* * * * *